(12) United States Patent
Lee et al.

(10) Patent No.: US 8,763,930 B1
(45) Date of Patent: Jul. 1, 2014

(54) TWIN-NOZZLE BOW THRUSTER FOR HOVERCRAFT

(75) Inventors: Yu-Tai Lee, McLean, VA (US); Paul A. Coffin, Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 783 days.

(21) Appl. No.: 13/043,818

(22) Filed: Mar. 9, 2011

Related U.S. Application Data

(60) Provisional application No. 61/313,077, filed on Mar. 11, 2010.

(51) Int. Cl.
*B63H 11/00* (2006.01)
*F02K 1/00* (2006.01)

(52) U.S. Cl.
USPC .......................... 239/265.11; 60/228; 60/770

(58) Field of Classification Search
USPC ........... 60/228, 230, 770; 239/265.11, 265.19
See application file for complete search history.

*Primary Examiner* — Gerald L Sung
*Assistant Examiner* — Scott Walthour
(74) *Attorney, Agent, or Firm* — Howard Kaiser (57) ABSTRACT

The present invention's nozzle is especially suitable for use in a shipboard air-discharge maneuverability device known as a "bow thruster." As typically embodied, the inventive nozzle includes a nozzle wall and an arc-shaped vane. The nozzle wall has a circular nozzle inlet and an elliptical nozzle outlet, and is configured so that the geometric major axis of the nozzle outlet is horizontal. The arc-shaped vane: is upwardly bowed in the nozzle wall's transverse direction; joins the nozzle wall along its two horizontally opposite sides in the nozzle wall's longitudinal direction; extends most or all of the longitudinal distance between the nozzle inlet and the nozzle outlet; has a transversely intermediate section that, taken in the transverse direction, is generally uniform in thickness; has two transversely lateral sections that, taken in the transverse direction, gradually thicken toward the two respective joints of the arc-shaped vane with respect to the nozzle wall.

18 Claims, 9 Drawing Sheets

| BT Type | Loss (psf) | | |
|---|---|---|---|
| | Entrance | Nozzle | Total |
| BT-15 | 27.3 | 75.03 | 102.33 |
| BT-16 | 33.06 | 23.61 | 56.68 |
| BT-17 | 33.48 | 19.67 | 53.15 |
| BT-18 | 32.22 | 19.51 | 51.73 |

FIG. 17 BT18 (SIDE VIEW)

FIG. 18 BT18 (BOTTOM VIEW)

FIG. 19 BT18M (SIDE VIEW)

FIG. 20 BT18M (BOTTOM VIEW)

TWIN-NOZZLE BOW THRUSTER FOR HOVERCRAFT

CROSS-REFERENCE TO RELATED APPLICATIONS

This application claims the benefit of U.S. provisional application No. 61/313,077, filed 11 Mar. 2010, hereby incorporated herein by reference, entitled "Twin-Nozzle Bow Thruster for Hovercraft," joint inventors Yu-Tai Lee and Paul A. Coffin.

BACKGROUND OF THE PRESENT INVENTION

The present invention relates to directional control of a hovercraft (also commonly known as an "air-cushion vehicle," or "ACV"), more particularly to systems and devices involving discharge of high-velocity air for maneuvering a hovercraft.

Figure 1:
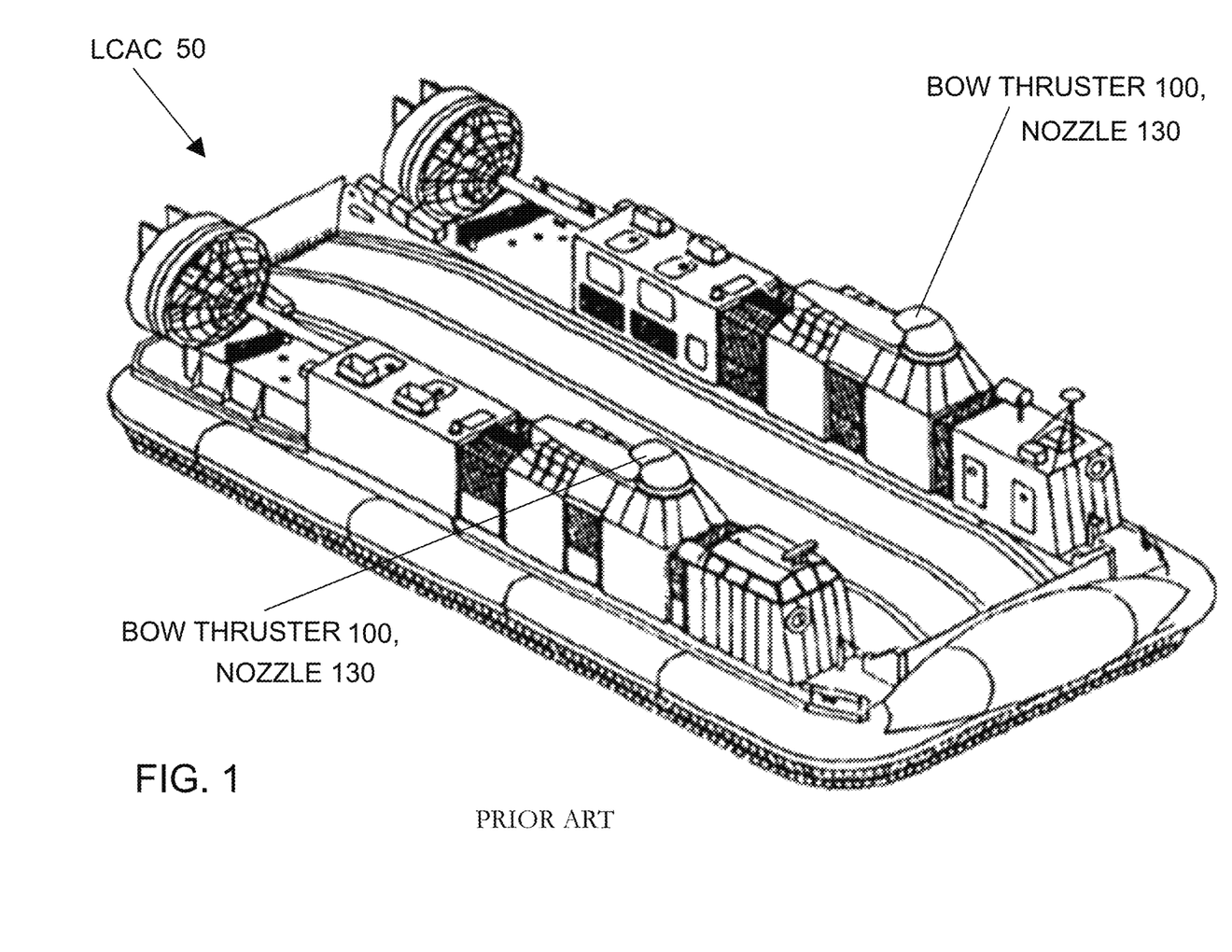
FIG. 1 is a generic diagram of a Navy LCAC having two bow thrusters.

Many air-cushion vehicles are equipped with bow thrusters. The United States Navy's Landing Craft Air Cushion (LCAC) is an amphibious landing vehicle that implements air-cushion technology and that is primarily used to transport weapons, equipment, cargo, and personnel from ship to shore. FIG. 1 depicts a representative LCAC 50, including two bow thrusters 100 (one port, one starboard). Bow thruster ("BT") systems are important components of the control system of an LCAC, and are especially useful at lower speeds for negotiating crowded waters, docking, or approaching shore.

High-velocity air generated by the port and starboard lift fans not only lifts the LCAC, but also is ducted to each of the two bow thrusters. High-velocity air leaves the nozzle of each bow thruster, thus representing thrust that augments directional control, provided by both rudder and propeller, of the craft. Typically, each bow thruster 100 includes a rotatable 90-degree nozzle 130, and is used as a thrust-generation and directional-control device. Centrifugal fans provide pressurized air to the nozzle, which is rotatable to eject air in 360-degree directions to generate thrust for directional controls.

With reference to FIG. 2 through FIG. 6, the performance of the nozzle interior flow depends on the nozzle inflow conditions and the nozzle flow-path design. Since the nozzle is to be rotatable for the directional control, the nozzle entrance (inlet) 131 usually has a circular shape. In furtherance of design efficiency (e.g., aerodynamic efficiency), the nozzle exit (outlet) 132 usually has an elliptical shape. An inlet flow straightener portion 141 of horizontal vane 135 extends into inlet 131 and serves to improve the entering flow. A blending shape section 133 is developed between the nozzle inlet 131 and the nozzle outlet 132 to convert the circular cross-section to the elliptical cross-section.

Figures 2, 3, 4:
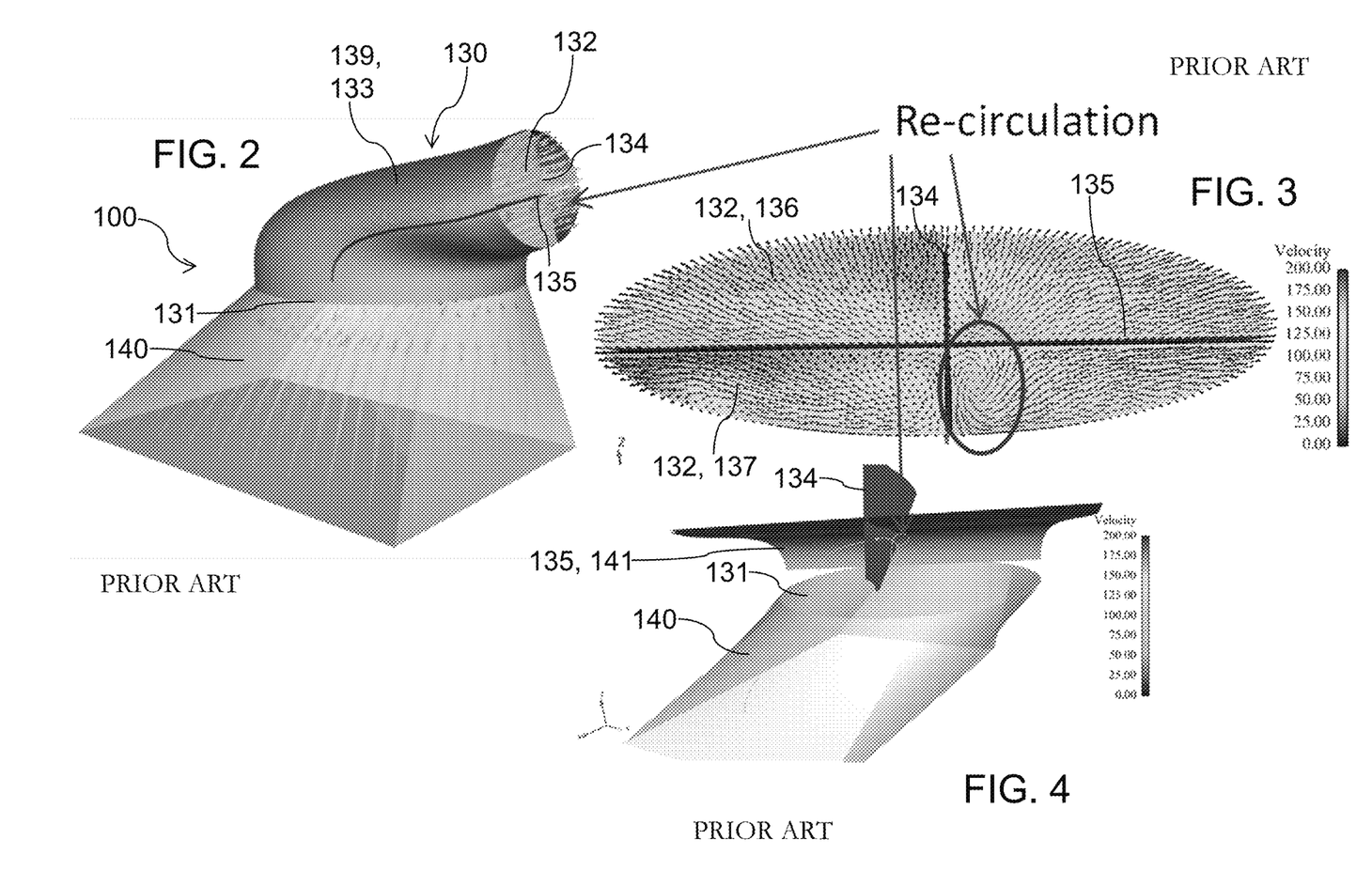
FIG. 2 through FIG. 5 are diagrams of a BT-16 bow thruster nozzle.

An example of a conventional 90-degree bow thruster nozzle 130 is designated herein "BT-16" and is depicted in FIG. 2 through FIG. 5. The BT-16 nozzle 130 is shown connected, at the nozzle inlet 131, to a slanted non-nozzle duct 140. In order to maintain the originally designed cross-sectional shapes of the nozzle wall 139 along the nozzle flow path, vertical and horizontal vanes (such as vertical vane 134 and horizontal vane 135, shown in FIG. 3 and FIG. 5) are traditionally installed inside the nozzle wall 139, in the nozzle flow path, to be used as structural stiffeners. These vanes usually cause flow re-circulation and separation from the attached surfaces, such as illustrated in FIG. 2 through FIG. 4. The bow thruster 100 designated herein "BT-15" (not shown) has the same nozzle 130 as bow thruster BT-16, but with a chamber-type plenum connected to the nozzle inlet 131.

Figure 5:
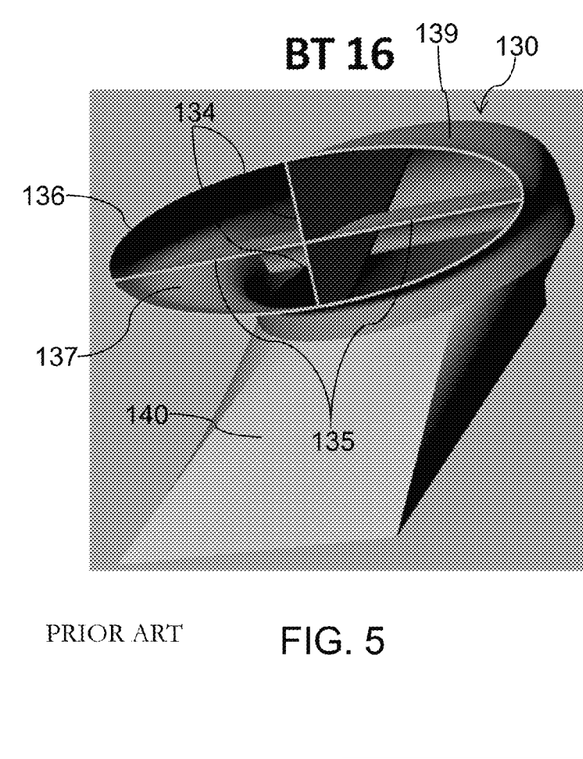
Figure 6:
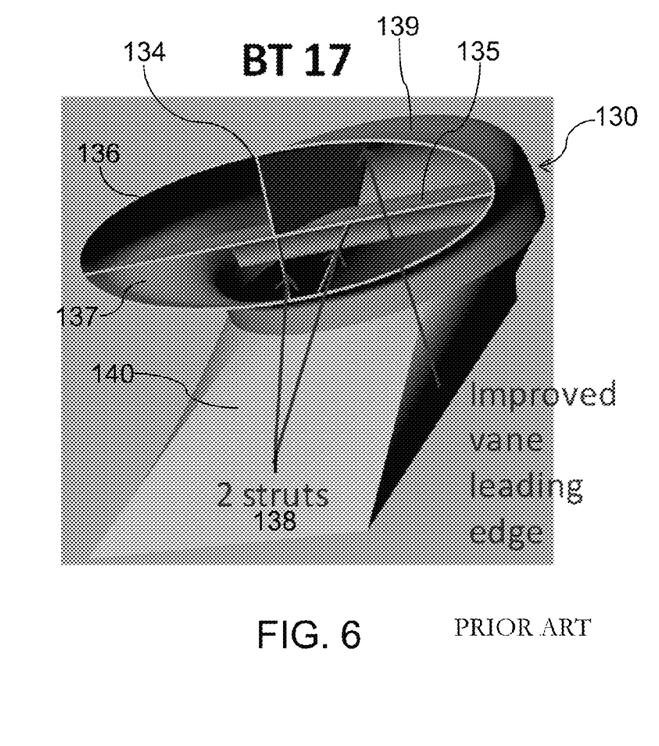
FIG. 6 is a diagram of a BT-17 bow thruster nozzle.

Another example of a 90-degree bow thruster nozzle 130 that implements both horizontal and vertical vanes is designated herein "BT-17" and is depicted in FIG. 6. Vis-à-vis the BT-16, the BT-17 effects some local modification of the vertical vane 134. As compared with the BT-16 nozzle (FIG. 5), the BT-17 nozzle 130 (FIG. 6) has a shorter vertical vane 134 along the vertical vane 134 leading edge. That is, the BT-17's vertical vane 134 vertically extends between the horizontal vane 135 and the top area of the nozzle wall 139, over approximately fifty percent of the minor diameter of the nozzle outlet 132. By comparison, the vertical vane 134 of the BT-16 extends over the entire minor diameter of the nozzle outlet 132. In addition to being abbreviated in the vertical direction vis-à-vis the BT-16's vertical vane 134, the leading edge of the BT-17's vertical vane 134 is characterized by a different vertical angle from that of the BT-16's vertical vane 134.

In either the BT-16 design or the BT-17 design, the horizontal vane 135 can be considered to divide the nozzle 130 region in the vicinity of nozzle outlet 132 into upper and lower nozzle portions, viz., an upper nozzle component 136 and a lower nozzle component 137. The vertical vane 134 of the BT-16 vertically spans both the upper nozzle component 136 and the lower nozzle component 137 of the nozzle 130. In contrast, the vertical vane 134 of the BT-17 vertically spans only the upper nozzle component 136 of the nozzle 130. For the lower nozzle component 137 of the BT-17 nozzle 130, the vertical vane 134 is replaced by two stiffener struts 138 at the leading and trailing edges, respectively, of the horizontal vane 135, thereby reducing flow separation, and hence reducing the aerodynamic losses by about six percent, vis-à-vis the BT-16 nozzle 130. Although the two struts 138 are intended to lend structural support to the nozzle 130, the construction of the BT-17 in terms of its abbreviated vertical vane 134 has not been verified for its structural integrity.

SUMMARY OF THE PRESENT INVENTION

According to typical inventive practice, an inventive bow thruster nozzle includes a nozzle wall and a horizontal arcuate vane. The nozzle wall has an oval outlet and a round inlet. The horizontal arcuate vane extends longitudinally backward from the oval outlet (e.g., to a location proximate the round inlet), and extends across the nozzle wall. The horizontal arcuate vane meets the nozzle wall along crosswise opposite longitudinal junctions of the nozzle wall so as to define a cross-sectionally reniform upper nozzle component and a cross-sectionally oval lower nozzle component. The horizontal arcuate vane has a convexly curved upper surface and a concavely curved lower surface. The horizontal arcuate vane is characterized, across the nozzle wall, by a generally uniform medial thickness and by a gradually increasing thickness toward the junctions. The horizontal arcuate vane is the only vane that the inventive bow thruster nozzle includes.

The BT-15, the BT-16, and the BT-17, discussed hereinabove, are BT designs previously used or considered by the U.S. Navy. Important elements common to the BT-15, BT-16, and BT-17 bow thrusters are a vertical vane having a planar configuration, a horizontal vane having a planar configuration, and the perpendicularity of the vertical vane with respect to the horizontal vane along the geometric flow-directional bisector of the horizontal vane. The bow thruster designated herein "BT-18" is an example of a bow thruster in accordance with the present invention. As distinguished from the BT-15, BT-16, and BT-17, the present invention's BT-18 bow thruster nozzle features a horizontal vane having a curved configuration, and further features the complete absence of a vertical vane or other interior support member or members (such as stiffener struts) connected to the nozzle wall or the horizontal vane.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein like numbers indicate same or similar parts or components, and wherein:

FIG. 12, FIG. 14, and FIG. 15 are illustrative of aerodynamic performance of the present invention's BT-18 bow thruster nozzle.

The BT-18M bow thruster nozzle is another embodiment of a bow thruster nozzle in accordance with the present invention.

EXEMPLARY EMBODIMENTS OF THE PRESENT INVENTION

Figure 7:
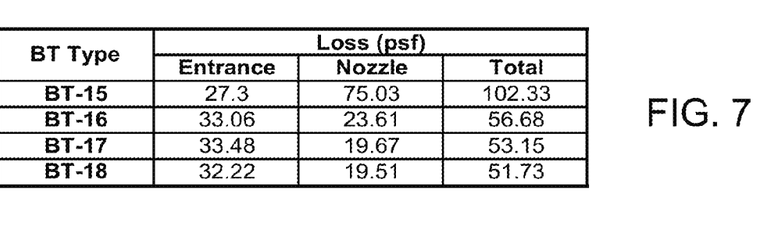
FIG. 7 is a table comparing aerodynamic characteristics among the BT-15 bow thruster nozzle, the BT-16 bow thruster nozzle, the BT-17 bow thruster nozzle, and the BT-18 bow thruster nozzle. The BT-18 bow thruster nozzle is an embodiment of a bow thruster nozzle in accordance with the present invention.

With reference to FIG. 7, the bottom row of the table corresponds to the present invention's embodiment referred to herein as the "BT-18," the predicted air pressure losses are tabularly shown through four different BT nozzle designs. The loss comparisons shown in FIG. 7 are among the BT-15, BT-16, BT-17, and BT-18 types of bow thrusters. As reflected in FIG. 7, since the inflow conditions were greatly improved in BT-16 versus BT-15, the total aerodynamic losses was reduced by 45%. The vertical and horizontal vanes in BT-16 produce local flow disturbances and pressure gradients, particularly the vertical vane; the improvement in BT-17 vis-à-vis BT-16 is manifest in FIG. 7. Notwithstanding the uncertainty of the structural integrity of the BT-17's vertical vane, the BT-17 seems to afford the minimum achievable aerodynamic losses using the conventional vertical-and-horizontal vane design. Note that the present invention's BT-18 bow thruster affords lower aerodynamic losses than does the BT-17 bow thruster.

Figures 8, 9:
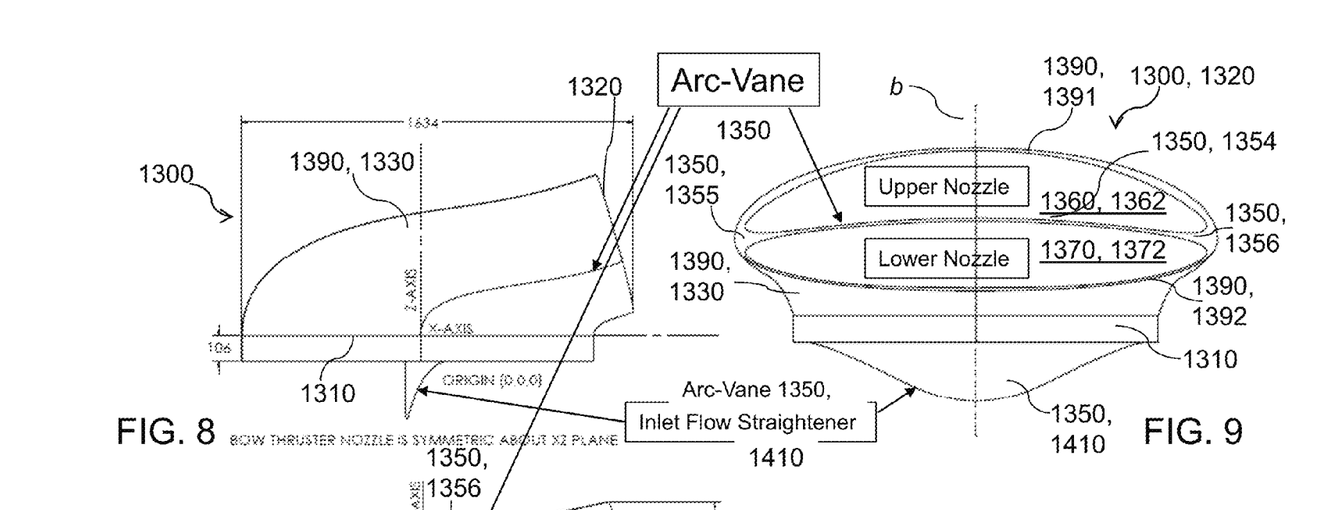
FIG. 8 through FIG. 12, FIG. 14, FIG. 15, FIG. 17, and FIG. 18 are diagrams of the present invention's BT-18 bow thruster nozzle.
Figure 10:
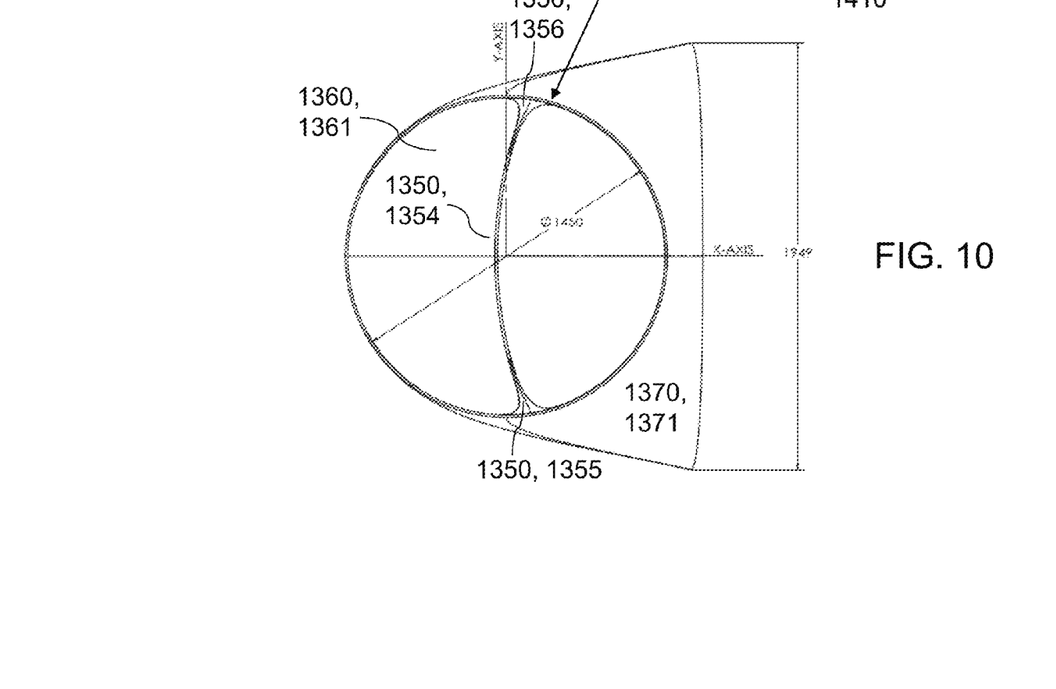
Figure 11:
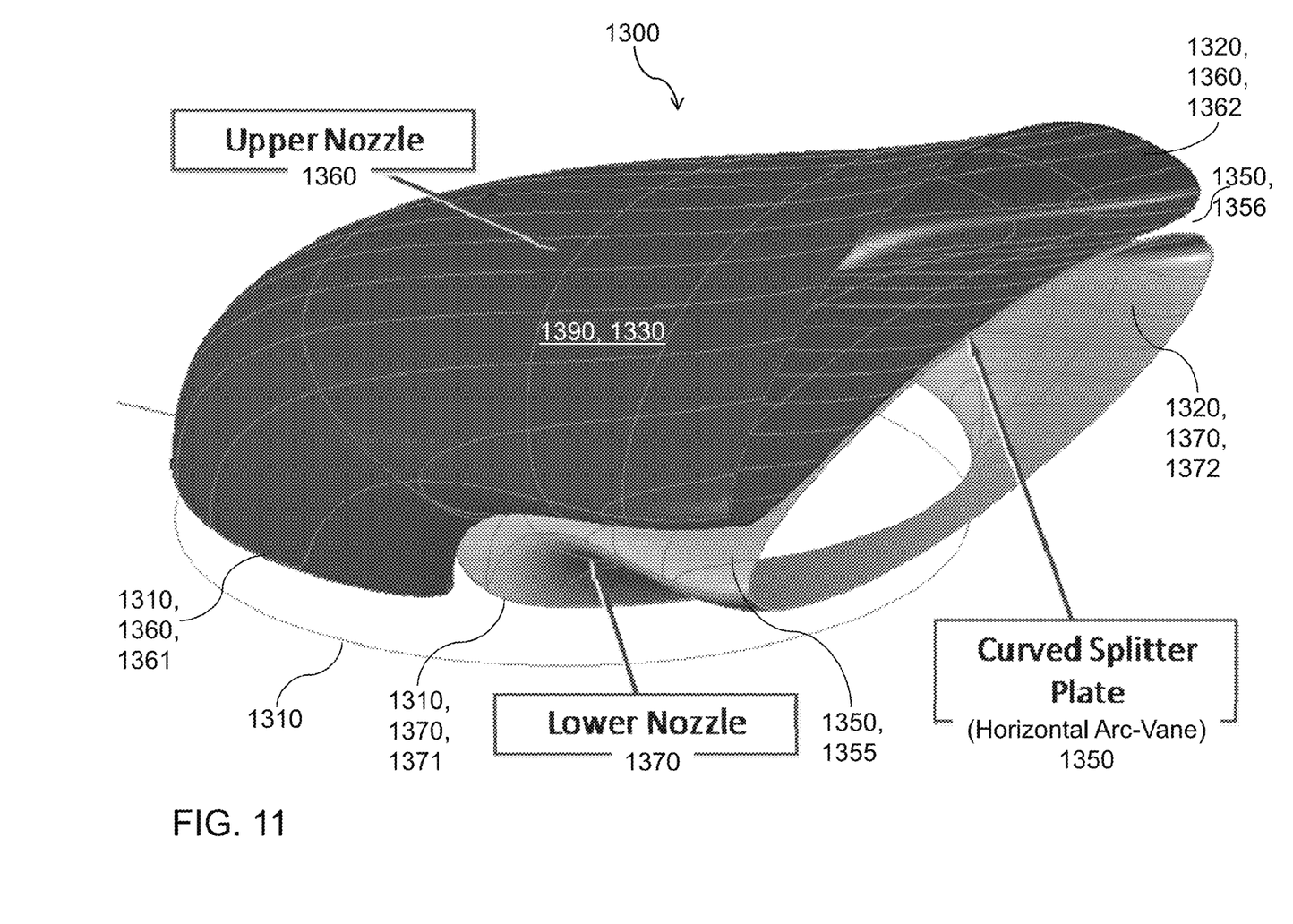

Now referring to FIG. 8 through FIG. 11, the present invention bow thruster 1000 includes a nozzle 1300 featuring an aerodynamically efficient 90-degree twin-nozzle design characterized by a unique nozzle geometry and a strong structural nozzle frame. The present invention's aerodynamically efficient 90-degree bow thruster nozzle 1300 has a structurally enhanced two-path arrangement. Wall 1390, the main duct body of the inventive nozzle 1300, includes an upper nozzle wall portion 1391 and a lower nozzle wall portion 1392. The present invention's horizontal arc-vane 1350 is situated between the upper nozzle wall portion 1391 and the lower nozzle wall portion 1392, dividing the inventive nozzle 1300 into the upper nozzle component 1360 and the lower nozzle component 1370. Horizontal arc-vane 1350 is the only vane included by bow thruster nozzle 1300. Geometric vertical bisector b is shown in FIG. 9 to emphasize the symmetry of the nozzle 1300 as well as the absence of a vertical vane.

The present invention's horizontal arc-vane 1350 is the delimitive section of the present invention's nozzle 1300, where the wall surfaces of the upper and lower nozzle components adjoin. Horizontal arc-vane 1350 extends across nozzle wall 1390 and extends from elliptical outlet 1320 (or approximately so) to either a location between elliptical outlet 1320 and circular inlet 1310, or a location even with circular inlet 1310, or a location beyond circular inlet 1310. Horizontal arc-vane 1350 includes a flow straightener section 1410, which is the substantially straight portion of horizontal arc-vane from its inlet end tip to a location generally where the nozzle wall 1390's axially-longitudinally curved blending shape section 1330 begins. Blending shape section 1330 is nozzle wall 1390's axial-longitudinal nozzle expanse between the nozzle inlet 1310 and the nozzle outlet 1320, and converts the nozzle inlet 1310's circular cross-section to the nozzle outlet 1320's elliptical cross-section. Blending shape 1330 is the portion of nozzle wall 1390 that configurationally transitions between inlet 1310 and outlet 1320 by gradually changing shape in the axial-longitudinal direction therebetween.

Typically, horizontal arc-vane 1350 extends approximately from elliptical outlet 1320 to a location in the vicinity of (e.g., at or near or proximate or relatively close to) circular inlet 1310. For instance, as shown by way of example in FIG. 8 and FIG. 9, horizontal arc-vane 1350's flow straightener section 1410 extends to a location that is beyond circular inlet 1310, but that is in the vicinity of circular inlet 1310. FIG. 9 illustrates the transverse edge curvature (roundedness) of horizontal arc-vane 1350 in its flow straightener section 1410 at its inlet end. FIG. 8 illustrates the lateral (side) edge curvature of horizontal arc-vane 1350 in its inlet flow straightener section 1410 at its inlet end. According to many inventive embodiments, horizontal arc-vane is characterized (in its inlet flow straightener section 1410) by a symmetrical convex edgewise curvature along its inlet tip, similarly as shown in FIG. 9.

According to typical inventive practice, circular inlet 1310 lies in an approximately horizontal geometric plane, such as shown in FIG. 8. Elliptical outlet 1320 can be oriented in practically any direction, usually a non-horizontal direction, depending on the inventive application. Typically, elliptical outlet 1320 lies in a geometric plane that is vertical or nearly so, such as shown in FIG. 8. Nozzle 1300 is characterized by a geometric longitudinal axis that curves (e.g., bends)

between the outlet's non-horizontal geometric plane and the inlet's horizontal geometric plane.

The elliptical shape of the present invention's nozzle outlet is not necessarily elliptical in a strict geometric sense. Nor is the circular shape of the present invention's nozzle inlet necessarily circular in a strict geometric sense. In other words, inventive practice is not limited to these respective shapes according to their strict geometric definitions. According to usual inventive practice, the outlet is "approximately elliptical" (the term "approximately elliptical" being used synonymously herein with "oval," meaning elliptical or nearly elliptical or ellipse-like), and the inlet is "approximately circular" (the term "approximately circular" being used synonymously herein with "round," meaning circular or nearly circular or circle-like).

The inventive horizontal arc-vane 1350 commences at its inlet end as an inlet flow straightener 1410, which improves nozzle inflow condition and further reduces inventive nozzle 1300's overall aerodynamic losses. The nozzle inlet arc-vane 1350 further improves the aerodynamics when the inventive nozzle 1350 rotates. The arc-vane 1350 is further extended beyond the nozzle inlet 1310 circular section as all or part of an inlet flow straightener 1410 (such as exemplified by the inventive bow thruster embodiment designated herein "BT-18E"). Flow approaching or reaching the nozzle inlet 1310 is first rectified by the arcuate horizontal vane 1350's flow straightener section 1410, and is then divided by the inwardly continuing arcuate horizontal vane 1350 into the respective upper and lower nozzle component 1360 and 1370. Typical embodiments of the present invention lack a nozzle vertical vane and include an upwardly bulging arcuate horizontal vane 1350, i.e., a generally horizontal vane that is upwardly convex and downwardly concave. Inventive arc-vane 1350 has a convexly curved upper arc-vane surface 1351 and a concavely curved lower arc-vane surface 1352.

The present invention thus eliminates the nozzle vertical vane, and re-shapes the conventionally planar (flat) horizontal vane 135 as an arc-shaped horizontal vane (referred to herein as the "arc-vane") 1350. The inventive nozzle, as typically embodied, is referred to herein as a "twin-nozzle." The inventive nozzle is dichotomously constructed as including two separate nozzles (also referred to herein as two separate "nozzle components"), viz., the upper nozzle 1360 (also referred to herein as the upper nozzle component 1360) and the lower nozzle 1370 (also referred to herein as the lower nozzle component 1370). The upper nozzle component 1360 is above the lower nozzle component 1370.

Horizontal vane 1350 divides the nozzle 1300 region in the vicinity of nozzle outlet 1320 into upper and lower nozzle portions, viz., an upper nozzle component 1360 and a lower nozzle component 1370. Each nozzle component is characterized by an oblong closed-curve cross-sectional shape. The upper nozzle component 1360—including and between upper nozzle component outlet 1362 and upper nozzle component inlet 1361—is characterized by a kidney-shaped (reniform) cross-section, which is convex-upward and concave-downward. The lower nozzle component 1370—including and between lower nozzle component outlet 1372 and lower nozzle component inlet 1371—is characterized by an oval (e.g., elliptic or elliptical) cross-section, which is convex-upward and convex-downward. Although upper nozzle component inlet 1361 and upper nozzle component outlet 1362 are each reniform, they differ in shape in accordance with the difference in shape between nozzle inlet 1310 and nozzle outlet 1320. Similarly, although lower nozzle component inlet 1371 and lower nozzle component outlet 1372 are each oval, they differ in shape in accordance with the difference in shape between nozzle inlet 1310 and nozzle outlet 1320.

As illustrated in FIG. 8 through FIG. 11, the kidney-shaped (reniform) upper nozzle component 1360 and the oval (e.g., elliptic or elliptical) lower nozzle component 1370 are separated by the horizontal arc-vane 1350. The arc-vane 1350 delimits both the upper nozzle component 1360 (at its bottom) and the lower nozzle component 1370 (at its top); in particular, the arc-vane 1350's upwardly convex upper surface bounds the bottom of the upper nozzle component 1360's opening, and the arc-vane's downwardly concave lower surface bounds the top of the lower nozzle component 1370's opening.

The BT-17 design improves aerodynamics by modifying the vertical vane, but is structurally suspect due to the truncation of the vertical vane. Otherwise expressed, the BT-17's approach involving partial vertical vane removal is deficient. As compared with the BT-17, the present invention's twin-nozzle design BT-18 is configured to reduce the stresses vis-à-vis those associated with the BT-17's specially designed vanes, and to further improve the aerodynamics. The present invention achieves these and other benefits by eliminating the vertical vane, and by replacing the conventionally planar horizontal vane 135 with an arcuate horizontal vane 1350. The arc-vane 1350's cross-section perpendicular to the nominal flow direction is shaped to minimize bending stresses and react the pressure loads as membrane stress. The present invention further increases the structural strength by thickening both ends of the arc-vane, where the local curvature is maximum, to react any residual bending loads.

Figure 17:
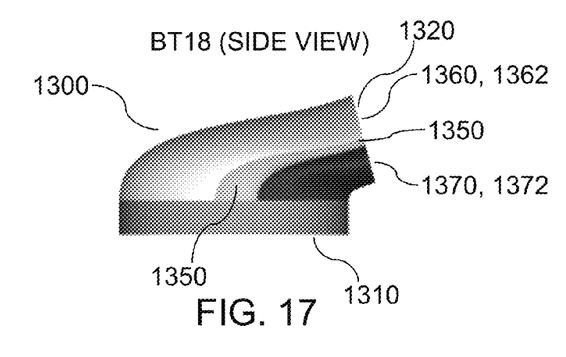
Figure 19:
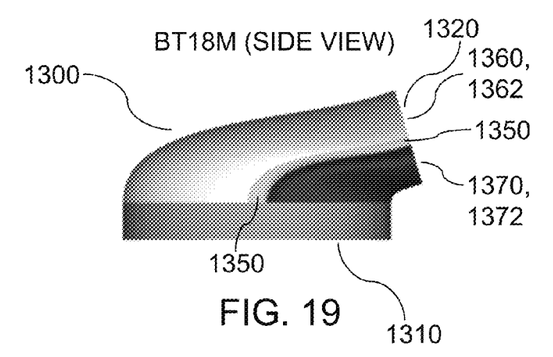
FIG. 19 and FIG. 20 are diagrams of the present invention's BT-18M bow thruster nozzle.

Considered in the transverse direction, horizontal arc-vane 1350 has a generally uniform medial arc-vane portion 1354 and, at opposite sides of nozzle wall 1390, two equivalently thickened lateral junctional arc-vane portions 1355 and 1356. The "transverse direction" with respect to inventive nozzle 1300 generally corresponds to the direction between the lateral junctional arc-vane portions 1355 and 1356. Similarly expressed, elliptical outlet 1320 is characterized, horizontally crosswise, by a geometric major elliptical axis, to which the transverse direction generally corresponds. The transverse direction is approximately perpendicular to the geometric longitudinal axis (or, is generally perpendicular to the airflow) of nozzle 1300. The present invention's nozzle 1300 can be embodied so as to vary in thickness in the axial-longitudinal direction, for instance gradually thinning out toward nozzle outlet 1320 such as illustrated in FIG. 17 and FIG. 19.

Each lateral junctional arc-vane portion represents a gradual thickening of arc-vane 1350, in the transverse direction, toward one of the two junctions where arc-vane 1350 meets nozzle wall 1390. As depicted by way of example in FIG. 9 and FIG. 11, each lateral junctional arc-vane describes a tapering that is curvilinear in furtherance of the curvature of the respective closed-curve profiles (cross-sections) of the upper nozzle component 1360 and the lower nozzle component 1370. The present invention's nozzle exit 1320, as typically embodied, describes in cross-section a regular oval (e.g., an ellipse). The inventive arc-vane 1350 thickens toward its lateral extremes, where the arc-vane meets the oval-cross-section wall of the nozzle exit.

According to prior bow thruster designs such as the BT-16, the center vertical vane is required to support the straight horizontal vane under the aerodynamic pressures. The present inventors took into consideration that the highest stresses in the flat horizontal vane are at the edges, due to the local bending moment and out-of-plane shear loads. Based on beam equations, it was determined by the present inventors that—in the absence of horizontal vane design change—removing the center vertical vane will increase moments at the horizontal vane's edges by four times and will double the shear loads. Further, the maximum deflections of the horizontal vane will increase sixteen times, in the absence of horizontal vane design change.

The present inventors thus realized that removal of the vertical vane will require a much thicker and more robust horizontal vane, which will carry negative implications in terms of aerodynamics, cost, and weight. It was therefore determined by the present inventors that the horizontal vane will require a re-design in order to remove the vertical vane without penalties.

A membrane held at the edges and subject to a pressure on the face will assume a shape that can react the load by only in-plane-tension stresses and shear stresses, with no bending moment or shear reaction. A solid plate formed to the same shape will, to a large extent, also have no bending moment or out-of-plane shear loads, and will just react the load through in-plane tension and shear stresses. The present invention's horizontal arc-vane 1350 is designed, and uniquely so, to form the membrane shape for a constant pressure load, so that sections of the arc-vane 1350 taken perpendicular to the nominal air flow direction manifest that the arc-vane 1350 is formed from segments of a circle, or arcs.

Figures 12, 13, 14, 15:
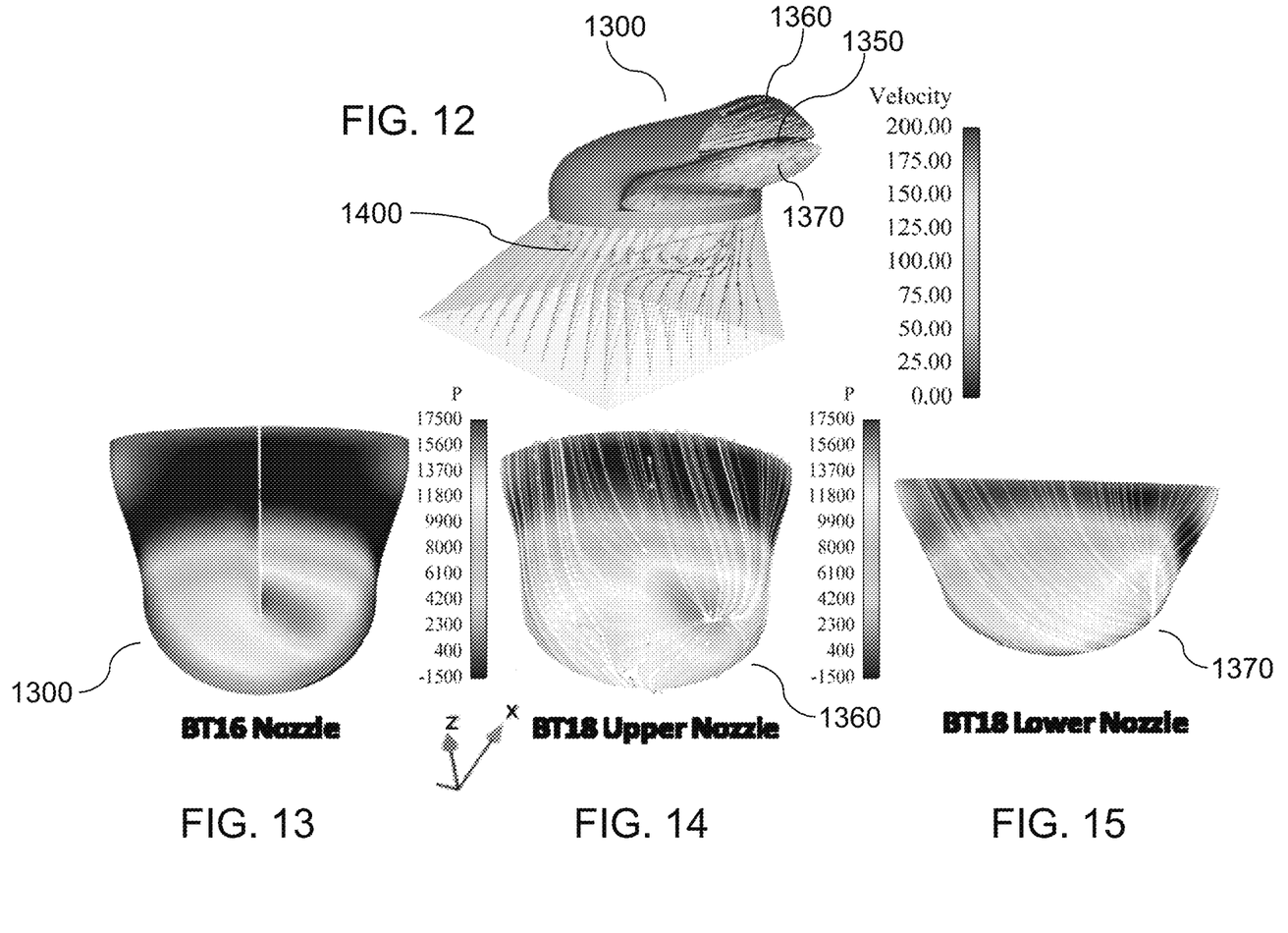
FIG. 13 is a diagram of the BT-16 bow thruster nozzle and is illustrative of aerodynamic performance of the BT-16 bow thruster nozzle.

With reference to FIG. 12, FIG. 14, and FIG. 15, the actual pressure field is not uniform, which will cause some bending and out of plane shear loads, but these will be deviations from nominally zero bending and shear loads or a membrane rather than deviations from the already high loads of a flat plate. Should the actual pressure field be known with more confidence, and be non-variable, the horizontal arc-vane 1350 shape could be optimized, but at the price of being sensitive to unexpected pressure changes.

In addition to FIG. 7, FIG. 12 through FIG. 15 also serve to compare aerodynamic performance between BT-16 and the present invention's twin-nozzle design as embodied in the BT-18. FIG. 12, FIG. 14, and FIG. 15 show the present invention's BT-18; FIG. 13 shows the BT-16. The high-pressure gradient introduced by the vertical vane in BT-16 has been reduced significantly by the present invention's BT-18. The high-pressure spot on the upper nozzle of the present invention's BT-18 is from the sloped inflow of the inlet duct. The flow separation in BT-18 is also reduced as compared with BT-16, which causes the aerodynamic losses to decrease by 17.4% for the nozzle portion of the present invention's BT-18 twin-nozzle design.

Figure 16:
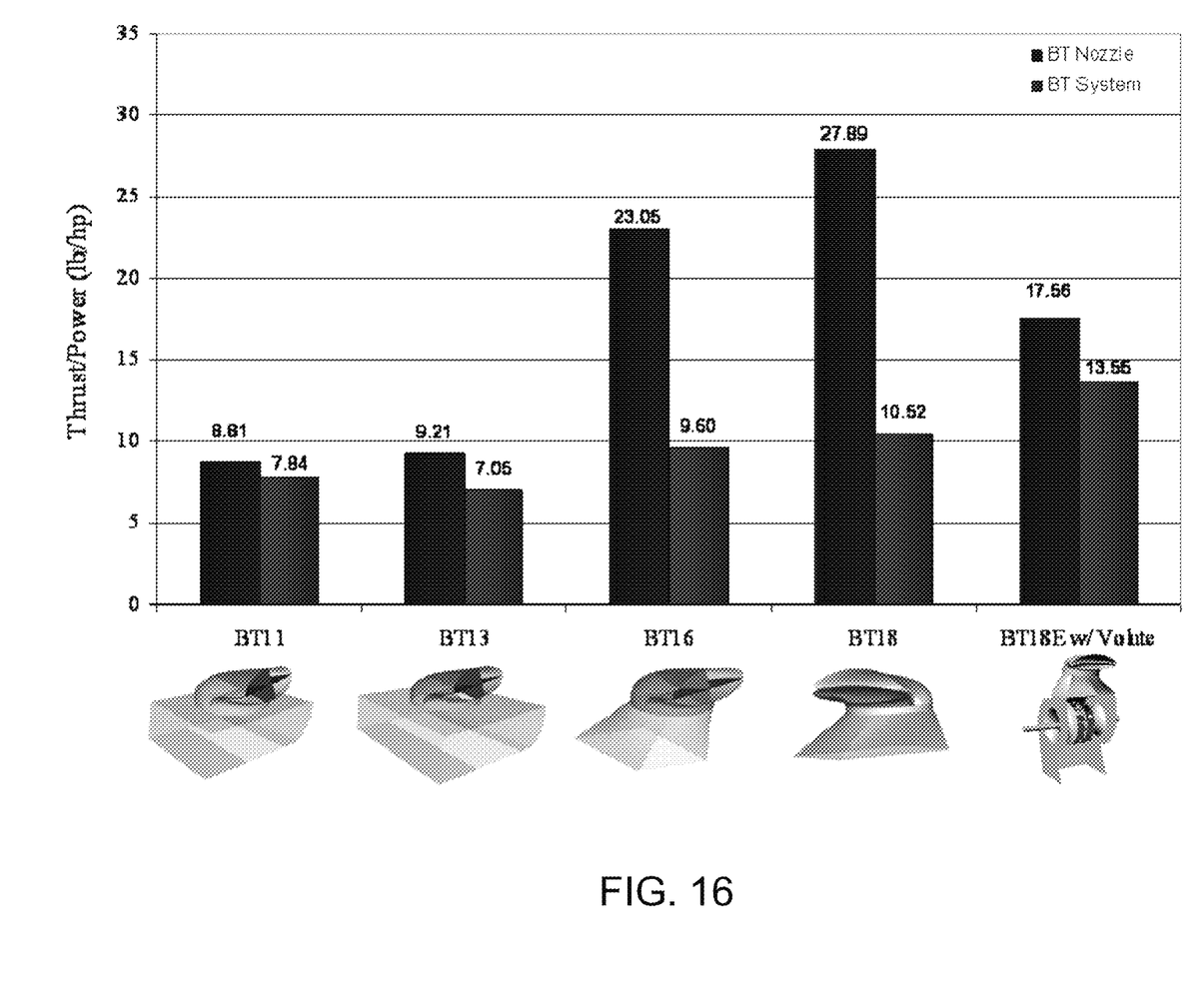
FIG. 16 is a graph comparing bow thruster nozzle performance in terms of thrust/power among the BT-11 bow thruster nozzle, the BT-13 bow thruster nozzle, the BT-16 bow thruster nozzle, the present invention's BT-18 bow thruster nozzle, and the present invention's BT18E bow thruster nozzle with the lift fan.

FIG. 16 graphically compares nozzle system performance at similar flow rates among several bow thruster nozzles, namely, the BT-11, the BT-13, the BT-16, the present invention's BT-18, and the present invention's BT-18E (with volute). The BT-11 nozzle, the BT-13 nozzle, and the BT-16 nozzle each have the horizontal and vertical guide vanes. The present invention's BT-18 nozzle and the present invention's BT-18E nozzle each have an arcuate horizontal guide vane and no vertical guide vane. The nozzle inlet is connected to either a plenum (for BT-11 and BT-13) or a transition duct (for BT-16 and BT-18). These devices, which are installed upstream of the nozzle, affect the nozzle inflow conditions.

The performances shown in FIG. 16 are represented by the thrust generated per unit power consumed. For each bow thruster system, the left (darker, taller) bar represents contribution only from the nozzle, and the right (lighter, shorter) bar is for the entire BT system. The BT-11, the BT-13, and the BT-16 have the same nozzle shapes. The BT-11 and the BT-13, however, have slightly different plenum designs. These three nozzles (BT-11, BT-13, and BT-16) perform better when the nozzle is connected to the transition duct instead of the plenum. The thrust per unit horsepower produced by the BT-16 is 2.5 times larger than that of the BT-11, as a result of the losses being less.

Comparing the nozzle system designs with the same transition duct, the present invention's twin-nozzle concept performs even better; for instance, the present invention's BT-18 has an increase of 4.84 lb$_f$/hp over that of the BT-16. Also included in FIG. 16 is the present invention's BT-18E nozzle system attached to a centrifugal fan. All other cases except this last case have a controlled inflow condition used for the comparative analyses. The present invention's BT-18E nozzle's thrust per unit horsepower drops by ten units as the result of a non-uniform flow entering the nozzle. The present invention's BT-18E with a volute has a smoother transition duct, and the overall system performance of the present invention's BT-18E nozzle is better than that of the present invention's B-18.

Figure 18:
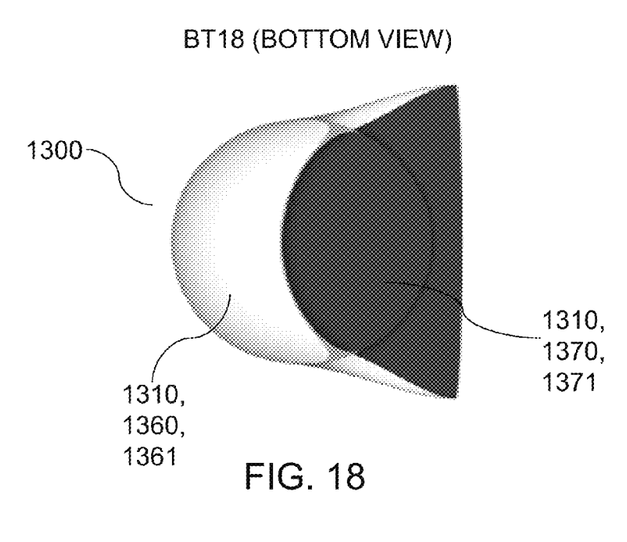
Figure 20:
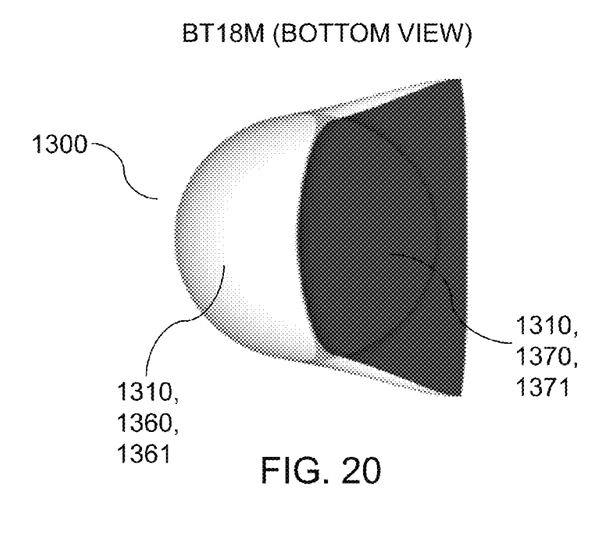

Reference now being made to FIG. 17 through FIG. 20, inventive practice admits of multifarious geometric/configurative variations. The present invention's BT-18 bow thruster is illustrated in FIG. 17 and FIG. 18. The present invention's bow thruster designated herein "BT-18M" is illustrated in FIG. 19 and FIG. 20. The present invention's BT-18M represents a modification of BT-18 that simplifies the manufacturing of the present invention's twin-nozzle design and that further enhances the inventive nozzle's structural strength. A notable geometric difference between the inventive BT-18 nozzle and the inventive BT-18M nozzle is in the circular entrance 1310 of each nozzle, which appears as the elongate rectangular bottom section in FIG. 17 (BT-18) and FIG. 19 (BT-18M). In addition, the degree of curvature of the inventive BT-18M's horizontal arc-vane 1350 is less than that for the BT-18's horizontal arc-vane 1350. The outlet 1320 profile curves of the present invention's BT-18M and the present invention's BT-18 are the same.

The BT-18M was modified from the BT-18 to simplify the manufacturing for a molded composite construction, such as glass fiber reinforced plastic (GRP), so that each of the upper nozzle 1360 and the lower nozzle 1370 can be made in two mirror-image halves, where the dividing line between the mirror-image halves is the geometric plane of symmetry of the nozzle. The reduced curvature of the horizontal splitter plate 1350 of the present invention's BT-18M, as compared to the horizontal splitter plate 1350 of the present invention's BT-18, allows each molded half of the kidney-shaped upper nozzle 1360 to be removed from a forming mold by rotation of the part as it is withdrawn from the mold. The remaining steps of the present invention's BT-18M fabrication—more specifically, including joining the nozzle halves to form the upper and lower nozzles, joining the upper and lower nozzles to form the twin nozzle geometry, and performing local reinforcing of edges and joints—can then be completed in accordance with standard composite fabrication practices.

Figures 21, 22:
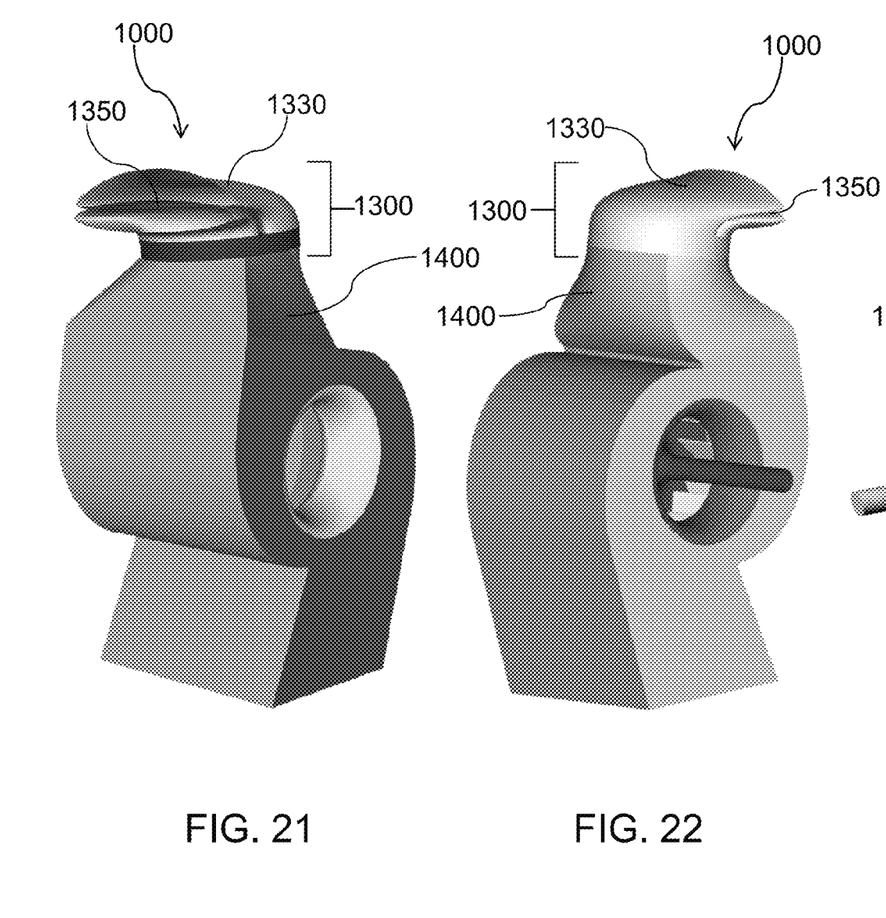
FIG. 21 through FIG. 23 are computer-generated representations of bow thrusters in accordance with the present invention. Such computer-generated representations are suitable for using computational fluid dynamics to assess performance of inventive bow thrusters.
Figure 23:
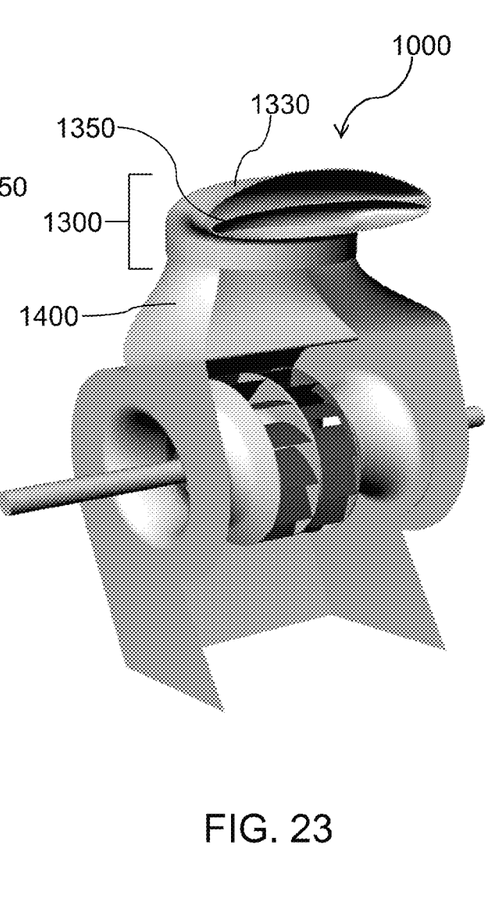

Performances of bow thruster systems in accordance with the present invention can be evaluated computationally (e.g., using computational fluid dynamics, or "CFD") in selected computational domains using computational geometries of inventive embodiments, such as shown in FIG. 21 through FIG. 23. Inventive nozzle 1300 is shown connected to a non-nozzle duct 1400.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A bow thruster nozzle comprising a nozzle wall and a horizontal arcuate vane, said nozzle wall having an oval outlet, said horizontal arcuate vane extending back from said oval outlet and across said nozzle wall, said horizontal arcuate vane meeting said nozzle wall along opposite junctions of said nozzle wall so as to define a cross-sectionally reniform upper nozzle component and a cross-sectionally oval lower nozzle component, said horizontal arcuate vane having a convexly curved upper surface and a concavely curved lower surface and being characterized, across said nozzle wall, by a generally uniform medial thickness and a gradually increasing thickness toward said junctions.

2. The bow thruster nozzle of claim 1, wherein said horizontal arcuate vane is the only vane comprised by the bow thruster nozzle.

3. The bow thruster nozzle of claim 1, wherein:
said nozzle wall has a round inlet;
said horizontal arcuate vane includes, toward its inlet end, an inlet flow straightener portion;
said inlet flow straightener portion extends inward of said nozzle wall from a location that is between said oval outlet and said round inlet, or that is even with said round inlet, or that is beyond said round inlet.

4. The bow thruster nozzle of claim 3, wherein said horizontal arcuate vane is the only vane comprised by the bow thruster nozzle.

5. The bow thruster nozzle of claim 3, wherein said location to which said inlet flow straightener portion extends is in the vicinity of said round inlet.

6. The bow thruster nozzle of claim 5, wherein said horizontal arcuate vane is the only vane comprised by the bow thruster nozzle.

7. The bow thruster nozzle of claim 6, wherein said nozzle wall includes a blending portion for configurationally transitioning between said round inlet and said oval outlet.

8. An air-discharge propulsive nozzle comprising:
an air duct having an approximately elliptical duct exit characterized by a geometric major elliptical axis; and
a splitter vane describing an upwardly convex, downwardly concave arc shape in a direction along said geometric major elliptical axis, said splitter vane having an intermediate vane section and two extreme vane sections, said intermediate vane section being characterized in said direction by an approximately uniform thickness, said two extreme vane sections connecting to said air duct and being characterized in said direction by gradually increasing thickness;
wherein said splitter vane divides said air duct into an upper air duct component and a lower air duct component, said upper air duct component having a reniform duct component exit, said lower air duct component having an approximately elliptical duct component exit.

9. The air-discharge propulsive nozzle of claim 8, wherein said splitter vane is the only vane that the air-discharge propulsive nozzle comprises.

10. The air-discharge propulsive nozzle of claim 8, wherein:
said approximately elliptical duct exit lies in a non-horizontal geometric plane;
said air duct has an approximately circular duct entrance lying in an approximately horizontal geometric plane;
said air duct is approximately characterized by a geometric longitudinal axis that curves between said non-horizontal geometric plane and said approximately horizontal geometric plane;
said splitter vane extends in a direction along said geometric longitudinal axis from said approximately elliptical duct exit to a location in the vicinity of said approximately circular duct entrance.

11. The air-discharge propulsive nozzle of claim 10, wherein said splitter vane is the only vane that the air-discharge propulsive nozzle comprises.

12. The air-discharge propulsive nozzle of claim 10, wherein said non-horizontal geometric plane in which said approximately elliptical duct exit lies is an approximately vertical geometric plane.

13. The air-discharge propulsive nozzle of claim 10, wherein:
said air duct is characterized by a duct curvature in said direction along said geometric longitudinal axis;
said splitter vane is characterized by a vane curvature in said direction along said geometric longitudinal axis;
said duct curvature and said vane curvature are congruous.

14. The air-discharge propulsive nozzle of claim 13, wherein said splitter vane is the only vane that the air-discharge propulsive nozzle comprises.

15. The air-discharge propulsive nozzle of claim 14, wherein said air duct includes a blending duct section for configurationally transitioning between said approximately circular duct entrance and said approximately elliptical duct exit.

16. The air-discharge propulsive nozzle of claim 8, wherein said splitter vane includes an entrance flow straightener section commencing in the vicinity of said approximately circular duct entrance and reaching inside said air duct.

17. The air-discharge propulsive nozzle of claim 16, wherein said entrance flow straightener section commences beyond said approximately circular duct entrance.

18. The air-discharge propulsive nozzle of claim 16, wherein said entrance flow straightener section is characterized, along its extreme edge in the vicinity of said approximately circular duct entrance, by an edgewise curvature.

* * * * *